P. A. JURIK.
AUTOMOBILE DIRECTION INDICATOR.
APPLICATION FILED JUNE 15, 1920.

1,368,502.

Patented Feb. 15, 1921.
2 SHEETS—SHEET 1.

Inventor
P. A. Jurik

By A. M. Wilson

Attorney

P. A. JURIK.
AUTOMOBILE DIRECTION INDICATOR.
APPLICATION FILED JUNE 15, 1920.

1,368,502.

Patented Feb. 15, 1921.

Inventor
P. A. Jurik
By A. W. Wilson
Attorney

UNITED STATES PATENT OFFICE.

PAUL A. JURIK, OF KENOSHA, WISCONSIN.

AUTOMOBILE DIRECTION-INDICATOR.

1,368,502.
Specification of Letters Patent. Patented Feb. 15, 1921.

Application filed June 15, 1920. Serial No. 389,058.

*To all whom it may concern:*

Be it known that I, PAUL A. JURIK, a citizen of the United States of America, residing at Kenosha, in the county of Kenosha and State of Wisconsin, have invented certain new and useful Improvements in Automobile Direction-Indicators, of which the following is a specification.

The present invention relates to certain new and useful improvements in automobile direction indicators and is designed to furnish an extremely practical foot-operated signaling means to warn pedestrians and others that a vehicle is about to turn either to the right or left as the case may be.

A further object of the invention is to provide an indicator of the above kind involving normally upright arms provided with separate means for operating the same whereby either may be swung downwardly to project beyond a side of the motor vehicle for indicating that the vehicle is about to turn toward that side, the arrangement, form and mounting of the parts being such as to constitute a durable and efficient device of its kind.

With these general objects in view and others that will appear as the nature of the invention is better understood, the same consists in the novel construction, combination and arrangement of parts hereinafter more fully described, illustrated in the accompanying drawings, and pointed out in the appended claims.

Figure 1:
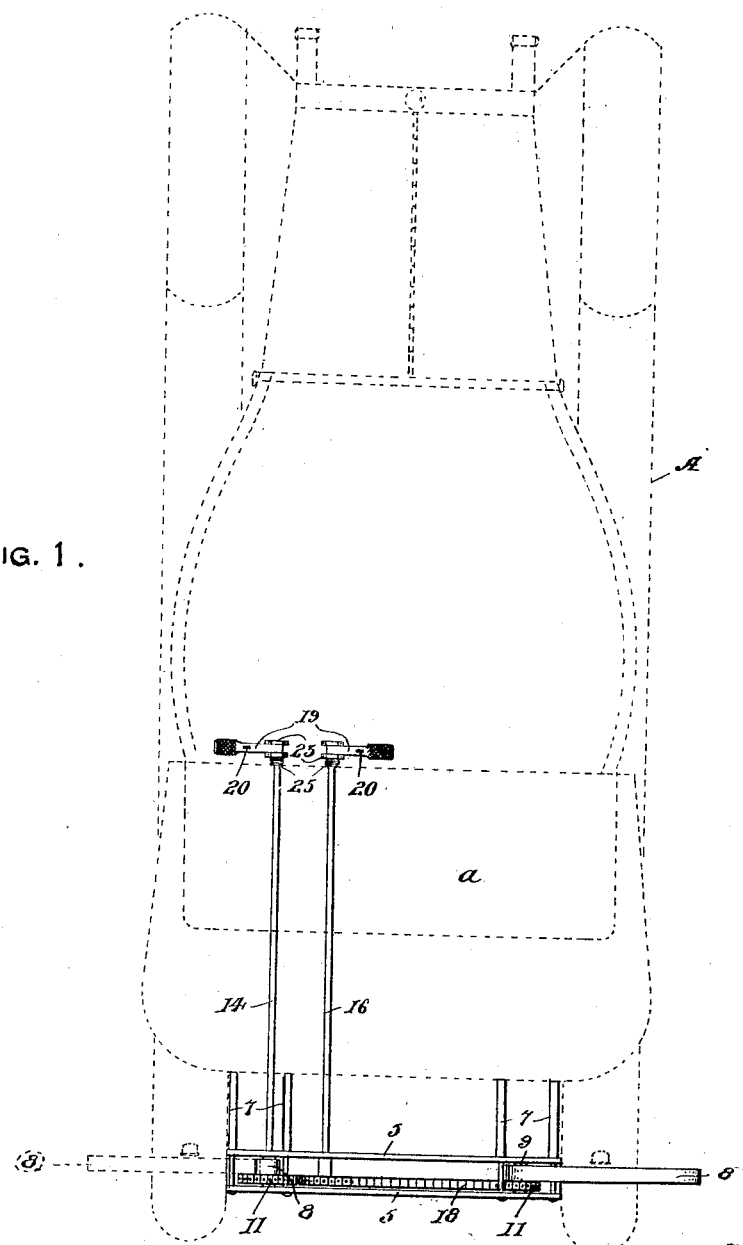
Figure 2:
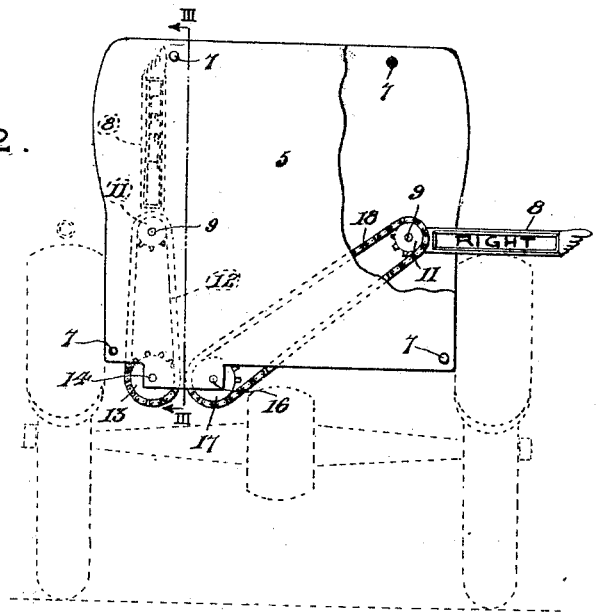
Figure 3:
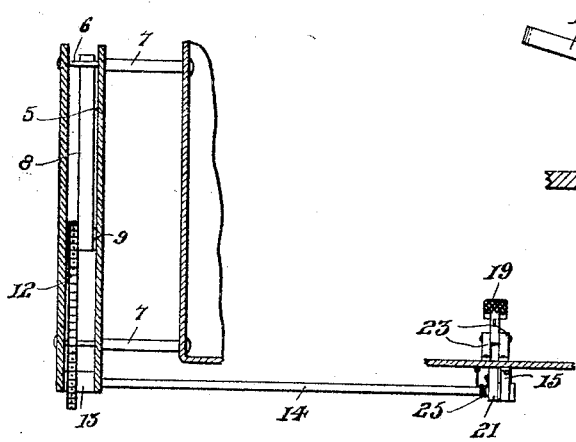
Figure 4:
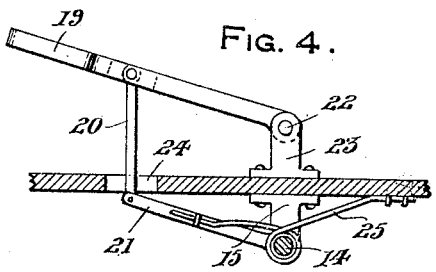
Figure 5:
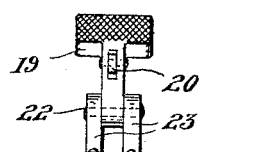
Figure 7:
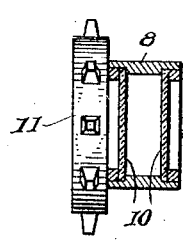
Figure 6:
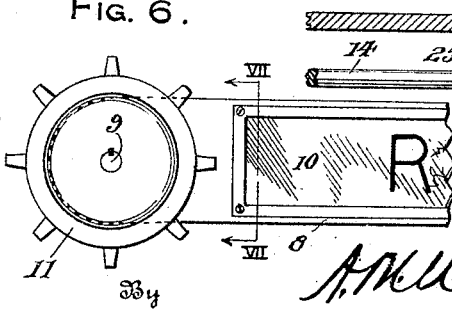

In the drawings forming a part of this application and in which like designating characters refer to corresponding parts throughout the several views, Figure 1 is a top plan view of a signal constructed in accordance with the present invention and shown operatively related with an automobile which is shown by dotted lines, Fig. 2 is a rear elevational view of the device shown in Fig. 1, partly broken away, Fig. 3 is a vertical sectional view taken substantially upon line III—III of Fig. 2, Fig. 4 is an enlarged fragmentary elevational view showing the foot-operating mechanism for the operating shafts of the signaling arms, Fig. 5 is a view of the device shown in Fig. 4, looking at right angles to the latter, Fig. 6 is an enlarged view of one of the signaling arms, partly broken away and associated with its sprocket wheel and Fig. 7 is a sectional view taken substantially upon line VII—VII of Fig. 6.

Referring more in detail to the several views, the present invention includes a pair of vertically disposed plates 5 arranged transversely of the automobile A and rigidly supported behind the rear seat of the automobile by suitable bolts 6, spacing sleeves 7 being provided on said bolts so as to maintain the plates rigidly in spaced relation to the rear seat. The plates 5 form a partial casing for obscuring signaling arms 8 when the latter are vertically disposed as shown with respect to one arm in Fig. 2, the arms 8 being each pivoted between the plates 5 adjacent one side of the automobile upon a shaft 9 so that when said arms are swung downwardly they may project beyond the adjacent side of the automobile as shown in Fig. 2, with respect to one arm whereby pedestrians and others may readily see the same. It is obvious, as is usual with this class of signal, that when the arm at the right hand side is down the indication is that the vehicle is going to turn to the right and when the left arm is down the indication is that the vehicle is going to turn to the left.

The arms 8 are preferably of hollow construction and have transparent panels 10 forming the sides thereof so as to accommodate any suitable form of illuminating means whereby the arms may be readily seen at night time. As this illuminating feature is common in the art and no particular claim is made to the form used herein, showing or description of the same is believed unnecessary. The panels 10 of one arm may be provided with the word "Right" and the other with the word "Left" so that there will be no misunderstanding as to the meaning of the signal. Each arm 8 has a sprocket wheel 11 rigid with the inner end thereof and rotatable upon the adjacent shaft 9, and a sprocket chain 12 passes around the sprocket wheel of one arm and also around another gear 13 fixed upon the rear end of a shaft 14 which is rotatably mounted beneath the floor of the car in the plates 5 and in a suitable bracket 15 secured underneath the floor of the vehicle adjacent the seat *a* as shown in Fig. 1. Another shaft 16 similar to the shaft 14 is similarly mounted beneath the floor of the vehicle and has a sprocket wheel 17 secured upon the rear end thereof between the plates 5. A second sprocket chain 18 passes around the sprocket wheel 17 and also around the sprocket wheel 11 of the other arm 8.

Both of the shafts 14 and 16 are provided with means for rotating the same by foot power including a foot-pedal or lever 19, and as the connection between each pedal 19 and its shaft is identical, description of one will suffice. As shown in Fig. 1, this connection consists in a link 20 pivoted at its upper end to the pedal 19 and at its lower end to the outer end of a lever 21 which is fixed upon the shaft 14 or 16 as the case may be, it being noted that the lever 19 is pivoted at one end as at 22 to a bracket 23 mounted upon the floor of the vehicle, while the link 20 extends through an opening 24 in the floor so as to connect to the lever 21. A spring 25 encircles each shaft 14 and 16 and is connected with the lever 21 thereof in such manner as to normally hold the foot lever 19 raised whereby the shaft is rotated to maintain the arms 8 normally in hidden vertical position.

It will thus be seen that when one pedal is depressed, rotation of the shaft 14 ensues and is imparted to the left hand arm to swing the same down into an exposed position from the vertical hidden position of Fig. 2. Also, when the pedal is released, the spring 25 immediately returns the left hand arm to its hidden position again. Similarly, when the other foot pedal 19 is depressed, the right hand arm is moved to its position of Fig. 2 and when said foot lever is released the associated spring 25 will return the right hand arm to a position wherein the same is hidden as is the case with the showing of the left hand arm in Fig. 2.

It is believed that the construction and operation as well as the advantages of the present invention will be appreciated and understood from the foregoing description by those skilled in the art.

Minor changes may be made therein without departing from the spirit and scope of my invention.

Having thus described my invention, what I claim as new and desire to secure by Letters Patent, is:—

1. An automobile signal comprising a shaft, means to rotatably mount said shaft longitudinally of an automobile beneath the floor of the latter so that the forward end of the shaft terminates at a point in front of the driver's seat and so that the rear end of the shaft terminates at a point rearwardly of said seat, a pair of transversely arranged and vertically disposed plates, means to rigidly mount said plates in spaced relation rearwardly of said seat, said shaft having its rear end journaled in the lower portion of said plates, a second shaft, means to rotatably mount said second shaft longitudinally of the automobile so that its ends terminate similarly with respect to the first named shaft, a signal arm pivoted between the plates for vertical swinging movement at each side of the automobile and each arm having a sprocket wheel connected thereto, sprocket connections between each shaft and one of said arms, and foot-operated means in front of the driver's seat operatively connected to each shaft for selectively causing the arms to lower from between the plates to an exposed position.

2. An automobile signal comprising a shaft, means to rotatably mount said shaft longitudinally of an automobile beneath the floor of the latter so that the forward end of the shaft terminates at a point in front of the driver's seat and so that the rear end of the shaft terminates at a point rearwardly of said seat, a pair of transversely arranged and vertically disposed plates, means to rigidly mount said plates in spaced relation rearwardly of said seat, said shaft having its rear end journaled in the lower portion of said plates, a second shaft, means to rotatably mount said second shaft longitudinally of the automobile so that its ends terminate similarly with respect to the first named shaft, a signal arm pivoted between the plates for vertical swinging movement at each side of the automobile, operating connections between each shaft and one of said arms, and means in front of the driver's seat operatively connected to each shaft for selectively causing the arms to lower from between the plates to an exposed position.

In testimony whereof I affix my signature.

PAUL A. JURIK.